UNITED STATES PATENT OFFICE.

THOMAS A. KASEY, OF SALEM, VIRGINIA.

REMEDY FOR HOG CHOLERA.

SPECIFICATION forming part of Letters Patent No. 355,999, dated January 11, 1887.

Application filed April 19, 1886. Serial No. 199,383. (No specimens.)

*To all whom it may concern:*

Be it known that I, THOMAS A. KASEY, a citizen of the United States, residing at Salem, in the county of Roanoke and State of Virginia, have invented a new and useful Improvement in Compounds, of which the following is a specification.

My invention relates to medical compounds for the prevention and cure of hog cholera; and it consists of the several ingredients compounded in the manner and proportions hereinafter specified.

My compound consists of the following ingredients, in substantially the proportions specified, to wit: Blue-stone, (sulphate of copper,) one ounce; alum, one ounce; copperas, (sulphate of iron,) one ounce; sulphur, one ounce; Liverpool salt, one ounce; carbonate of soda, one ounce; asafetida, one-half of an ounce. These ingredients are pulverized to a very fine state and thoroughly and intimately mixed or commingled together by any suitable means, and it is then mixed with cornmeal or any other suitable vehicle, after which it is fed to the hog in suitable quantities, about one-half of an ounce of the mixture being put in the allowance of food for the animal.

In lieu of mixing the compound with the cornmeal or other suitable vehicle in a dry state, the compound, after having been pulverized, may be dissolved in hot water and be made into a thin gruel and fed to the animal in this manner, the latter-described method being employed when the animal is very sick.

The compound is fed to chickens in like manner; but the quantity of the mixture and the food is reduced and varied as circumstances may demand.

I am aware that some of the ingredients are old in this connection, and hence I limit myself to the combination as expressed.

Having thus described my invention, what I claim, and desire to secure by Letters Patent, is—

The herein-described composition of matter for the prevention and cure of hog or chicken cholera, consisting of blue-stone, alum, sulphur, copperas, salt, carbonate of soda, and asafetida, in substantially the proportions specified.

In testimony that I claim the foregoing as my own I have hereto affixed my signature in presence of two witnesses.

THOMAS A. KASEY.

Witnesses:
P. H. McCAULL,
W. T. YOUNGER.